(12) United States Patent
Sun et al.

(10) Patent No.: US 12,482,237 B2
(45) Date of Patent: Nov. 25, 2025

(54) TARGET RE-IDENTIFICATION METHOD, NETWORK TRAINING METHOD THEREOF, AND RELATED DEVICE

(71) Applicant: ZHEJIANG DAHUA TECHNOLOGY CO., LTD., Zhejiang (CN)

(72) Inventors: Libo Sun, Hangzhou (CN); Huadong Pan, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 424 days.

(21) Appl. No.: 18/146,450

(22) Filed: Dec. 26, 2022

(65) Prior Publication Data

US 2023/0136547 A1     May 4, 2023

Related U.S. Application Data

(63) Continuation of application No. PCT/CN2020/139349, filed on Dec. 25, 2020.

(30) Foreign Application Priority Data

Jun. 29, 2020    (CN) .......................... 202010611552.1
Jul. 3, 2020    (CN) .......................... 202010637098.7

(51) Int. Cl.
    *G06V 10/774*     (2022.01)
    *G06V 10/82*     (2022.01)
(52) U.S. Cl.
    CPC ............ *G06V 10/774* (2022.01); *G06V 10/82* (2022.01); *G06V 2201/07* (2022.01)

(58) Field of Classification Search
None
See application file for complete search history.

(56) References Cited

U.S. PATENT DOCUMENTS 10,361,802 B1    7/2019   Hoffberg-Borghesani et al.
2020/0218888 A1*   7/2020   Gong .................. G06V 40/173
(Continued)

FOREIGN PATENT DOCUMENTS

CN     107657249 A     2/2018
CN     107944553 A     4/2018
(Continued)

OTHER PUBLICATIONS

Zongtao Song et al "Deep Convolutional Neural Networks with Adaptive Spatial Feature for Person Re-Identification" IEEE (Year: 2017).*

(Continued)

*Primary Examiner* — Leon Flores
(74) *Attorney, Agent, or Firm* — METIS IP LLC

(57) ABSTRACT

A device for transferring micro-components and a method of manufacturing the device are provided. The device includes a substrate, a metal wire, and a plurality of silicon electrodes. The metal wire is formed on a flat surface of the substrate and includes a plurality of electrode driving units. The silicon electrodes are formed on a side of the metal wire opposing to the substrate. Each silicon electrode corresponds to each electrode driving unit and is driven by the electrode driving unit to pick or release each micro-component. According to the present application, the device may electrostatically adsorb a massive amount of micro-components to achieve transferring the massive amount of the micro-components, dramatically improving a transfer efficiency.

20 Claims, 6 Drawing Sheets

(56) References Cited

U.S. PATENT DOCUMENTS

| | | | |
|---|---|---|---|
| 2020/0226421 A1* | 7/2020 | Almazan | G06N 3/045 |
| 2020/0250226 A1 | 8/2020 | Yang et al. | |
| 2020/0285896 A1* | 9/2020 | Huang | G06F 18/21322 |
| 2020/0342271 A1* | 10/2020 | Wang | G06V 10/776 |
| 2021/0052135 A1 | 2/2021 | Fu et al. | |
| 2021/0056693 A1 | 2/2021 | Cheng et al. | |
| 2021/0174149 A1 | 6/2021 | Zhou et al. | |

FOREIGN PATENT DOCUMENTS

| | | |
|---|---|---|
| CN | 108009512 A | 5/2018 |
| CN | 108229532 A | 6/2018 |
| CN | 108256439 A | 7/2018 |
| CN | 108549926 A | 9/2018 |
| CN | 108875487 A | 11/2018 |
| CN | 108875588 A | 11/2018 |
| CN | 109359552 A | 2/2019 |
| CN | 109766873 A | 5/2019 |
| CN | 109784182 A | 5/2019 |
| CN | 109871821 A | 6/2019 |
| CN | 110084139 A | 8/2019 |
| CN | 110096947 A | 8/2019 |
| CN | 110222717 A | 9/2019 |
| CN | 110378301 A | 10/2019 |
| CN | 110728263 A | 1/2020 |
| CN | 110765954 A | 2/2020 |
| CN | 111027454 A | 4/2020 |
| CN | 111126360 A | 5/2020 |
| CN | 111274922 A | 6/2020 |
| CN | 111274992 A | 6/2020 |
| CN | 111814655 A | 10/2020 |
| CN | 111814857 A | 10/2020 |

OTHER PUBLICATIONS

International Search Report in PCT/CN2020/139349 mailed on Nov. 15, 2021, 5 pages.

Written Opinion in PCT/CN2020/139349 mailed on Mar. 26, 2021, 5 pages.

First Office Action in Chinese Application No. 202010611552.1 mailed on Jan. 12, 2021, 23 pages.

Sun, Yifan et al., Beyond Part Models: Person Retrieval with Refined Part Pooling (and A Strong Convolutional Baseline), ARXIV, 1-17, 2018.

Yao, Lewei, Research on Person Re-Identification Based on Deep Learning Methods, China Masters' Theses Full-text Database, Information Technology Series, 2019, 76 pages.

Li. Junyi et al., Image Style Transfer Based On Perceptual Adversarial Networks, Journal of Hefei University of Technology (Natural Science), 43(5): 624-628, 2020.

* cited by examiner

TARGET RE-IDENTIFICATION METHOD, NETWORK TRAINING METHOD THEREOF, AND RELATED DEVICE

CROSS-REFERENCE TO RELATED APPLICATIONS

This application is a Continuation of International Application No. PCT/CN2020/139349, filed on Dec. 25, 2020, which claims priority of Chinese Patent Application No. 202010611552.1 filed on Jun. 29, 2020, and Chinese Patent Application No. 202010637098.7 filed on Jul. 3, 2020, the contents of each of which are hereby incorporated by reference.

TECHNICAL FIELD

The present disclosure relates to the field of target re-identification technologies, and in particular to a target re-identification method, a network training method thereof and a related device.

BACKGROUND

Target re-identification is a computer vision technology that achieves target identification by feature extraction and matching of targets in images or videos across shots. Target re-identification has very important application value in smart retail, smart transportation, and public security criminal investigation. The target may be pedestrians, vehicles, etc. Generally, a target re-identification network is applied for target identification, for example, a person re-identification (ReID) network is configured to identify pedestrian images. In the prior art, before putting into service, the ReID network is usually required to be trained to make the subsequent identification result obtained during the use process more accurate. However, the target re-identification network obtained by existing training methods is not accurate in target identification.

SUMMARY OF THE DISCLOSURE

The present disclosure provides a target re-identification method, a network training method thereof and a related device, to solve the problem that the target re-identification network obtained by existing training methods has low accuracy in target identification.

To address the above technical problem, the present disclosure provides a method for training a target re-identification network. The method includes obtaining a training image set, wherein the training image set includes a plurality of training images; for each of the plurality of training images in the training image set, identifying a training image based on the target re-identification network to obtain an identification result of the training image; wherein the target re-identification network includes a plurality of branches, the identification result of the training image includes a feature information output by each of the plurality of branches and a classification result corresponding to the feature information; the feature information output by one of the plurality of branches includes n local feature information, the n being greater than 3; the n local feature information correspond to different regions of the training image; and adjusting parameters of each of the plurality of branches of the target re-identification network based on the identification result.

To address the above technical problem, the present disclosure provides a target re-identification method. The method includes obtaining an image to be identified and a reference image, wherein the reference image includes a preset target; identifying the image to be identified and the reference image respectively based on a target re-identification network to obtain a feature information of the image to be identified and a feature information of the reference image; wherein the target re-identification network includes a plurality of branches; the feature information includes the feature information output by each of the plurality of branches; the feature information output by one of the plurality of branches includes n local feature information, the n being greater than 3; the n local feature information correspond to different regions of a corresponding image; fusing the feature information of the image to be identified output by each of the plurality of branches to obtain a fusion feature information of the image to be identified, and fusing the feature information of the reference image output by each of the plurality of branches a fusion feature information of the reference image; and determining whether the image to be identified includes the preset target based on a similarity between the fusion feature information of the image to be identified and the fusion feature information of the reference image.

To address the above technical problem, the present disclosure provides an electronic device. The electronic device includes a processor and a memory connected to the processor, wherein the memory stores program instructions; the processor is configured to execute the program instructions stored in the memory to implement the method as described above.

To address the above technical problem, the present disclosure provides a storage medium. The storage medium stores program instructions executed to implement the method as described above.

In the above solutions, the feature information extracted from one of the branches of the target re-identification network is divided into n (n>3) local feature information corresponding to different regions of the training image as output. Therefore, fine feature information may be extracted through the branch, enriching a granularity of feature extraction. On this basis, the feature information extracted by the trained target re-identification network may be more representative and more reflective of the target information in the image, thereby improving the accuracy of target identification by the target re-identification network.

DETAILED DESCRIPTION

Figure 1:
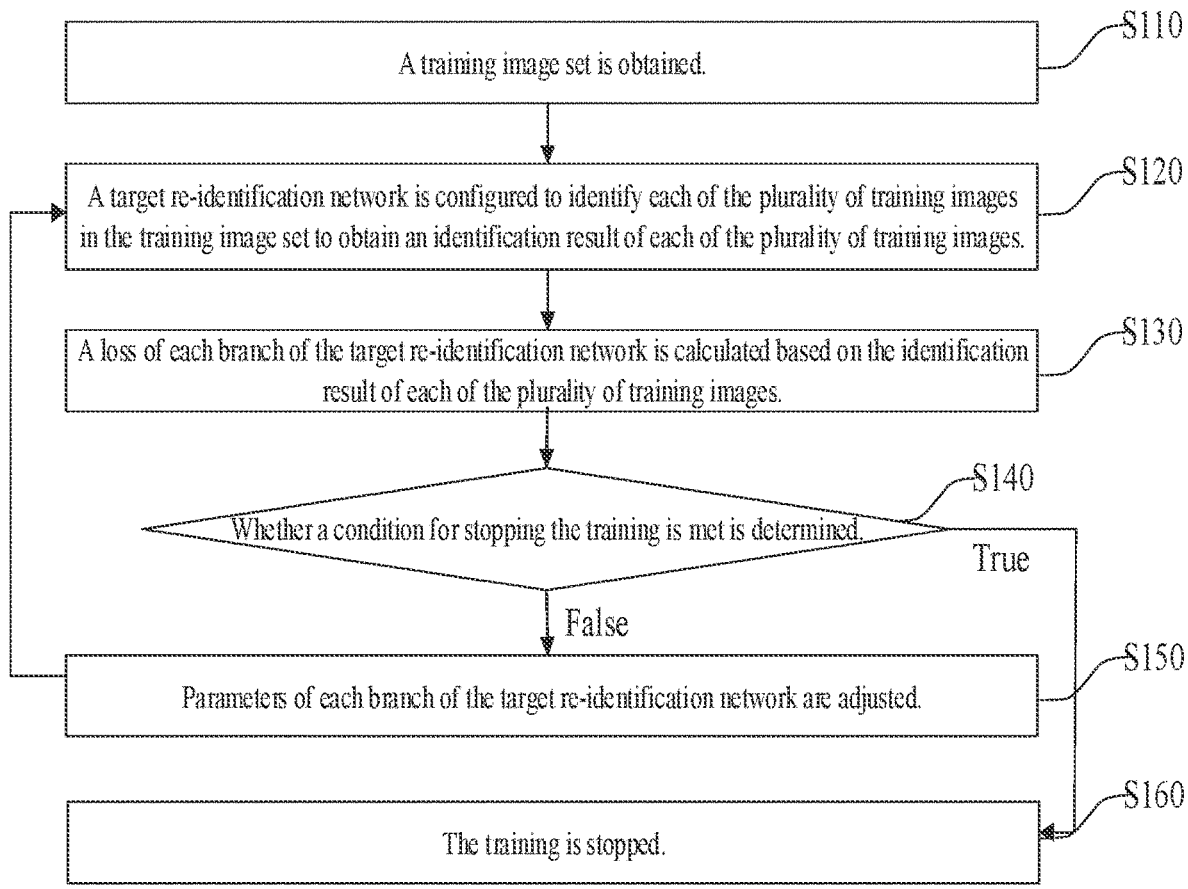
FIG. 1 is a flow chart of a training method for a target re-identification network according to a first embodiment of the present disclosure.

To make any one of skill in the art to understand the technical solutions of the present disclosure, the technical solutions provided by the present disclosure will be described in details by referring to the drawings and the embodiments. Obviously, the described embodiments are only a part of the embodiments, but not all the embodiments of the present disclosure. Based on the described embodiments, all other embodiments obtained by one skilled in the art without creative efforts shall fall within the scope of the present disclosure.

Terms of "first", "second", and "third" in the present disclosure are only for descriptive purposes, and cannot be understood as indicating or implying relative importance or implicitly indicating the number of indicated technical features. Therefore, the features defined with "first", "second", and "third" may explicitly or implicitly include at least one of the features. In the description of the present disclosure, "a plurality of" means at least two, such as two, three, etc., unless otherwise specifically defined.

Reference to "embodiment" herein means that a particular feature, structure, or characteristic described in connection with the embodiment may be included in at least one embodiment of the present disclosure. The appearances of this term in various places in the specification are not necessarily all referring to the same embodiment, nor are they independent or alternative embodiments that are mutually exclusive with other embodiments. It is explicitly and implicitly understood by one skilled in the art that the embodiments described herein may be combined with other embodiments.

FIG. 1 is a flow chart of a training method for a target re-identification network according to a first embodiment of the present disclosure. It should be noted that, when there are substantially the same results, the embodiment is not limited to the sequence of the process shown in FIG. 1. The method may include operations at blocks illustrated in FIG. 1.

At block S110: A training image set is obtained.

The training image set may include a plurality of training images.

The training images may be obtained based on scene images obtained by a photographing device. Each training image may be labeled. Specifically, a target detection algorithm may be configured to detect a target position in a scene image. An area corresponding to the target is cut out from the scene image based on the target position. The cut out area is adjusted to a specified size as a target image, and the target image is labeled to obtain a labeled training image. The label attached to the training image may be information of the target in the current training image, such as target ID information. The present disclosure describes the target as pedestrian as an example.

At block S120: A target re-identification network is configured to identify each of the plurality of training images in the training image set to obtain an identification result of each of the plurality of training images.

The target re-identification network may include a plurality of branches. The identification result of each training image may include a feature information output by each branch and a classification result corresponding to the feature information. The feature information output by one branch may include n local feature information, where n is greater than 3, and the n local feature information correspond to different regions of the corresponding training image.

The training image set may be sent to the target re-identification network, such that the target re-identification network identifies each image in the training image set, thereby obtaining the feature information of each image and the classification result corresponding to the feature information.

Feature maps or feature vectors may be configured to represent the feature information. The target re-identification network may be a multi-branch neural network, which includes a plurality of branches that can identify images. Therefore, the feature information of each training image obtained by the target re-identification network includes the feature information output by each branch. Taking the identification of one training image as an example, the feature information of the training image output by one of the branches of the target re-identification network includes n (n>3) local feature information. Each local feature information may be a feature map block of the training image. The n local feature information output by the branch may form the feature map of the training image. In other words, the feature map of the training image may be divided into multiple blocks for output. The feature map may be divided into striped blocks, such as horizontal striped blocks, vertical striped blocks, etc. Of course, in other embodiments, other division methods may also be applied as needed, which is not specifically limited herein.

At block S130: A loss of each branch of the target re-identification network is calculated based on the identification result of each of the plurality of training images.

The loss of the current branch of the target re-identification network may be calculated based on the feature information of the training image output by each branch. Reference may be made to the following embodiments for the specific calculation method.

At block S140: Whether a condition for stopping the training is met is determined.

A preset condition may be that the number of trainings reaches a preset number of times, or the training time reaches a preset time, or the training period reaches a preset period, or the calculated loss of each branch is less than a preset threshold, etc.

When the condition for stopping the training is not met, operation S150 is performed. When the condition for stopping the training is met, operation S160 is performed.

At block S150: Parameters of each branch of the target re-identification network are adjusted.

Parameters such as the weight of each branch may be adjusted based on the loss of the corresponding branch of the target re-identification network. The parameters of the target re-identification network are adjusted through back propagation, such that the target re-identification network may be gradually optimized, and the subsequent image identification results obtained in an actual application process are more accurate.

At block S160: The training is stopped.

After the training is completed, the last adjusted parameters may be retained as the parameters of the target re-identification network to identify an image to be identified in the actual application process.

After the operation S160 is performed, the method may jump to the above S120 to repeat the above operations until the condition for stopping training is met.

In the embodiment, the feature information extracted from one of the branches of the target re-identification network is divided into n (n>3) local feature information corresponding to different regions of the training image as output. Therefore, fine feature information may be extracted through the branch, enriching a granularity of feature extraction. On this basis, the feature information extracted by the trained target re-identification network may be more representative and more reflective of the target information in the image, thereby improving the accuracy of target identification by the target re-identification network.

Figure 2:
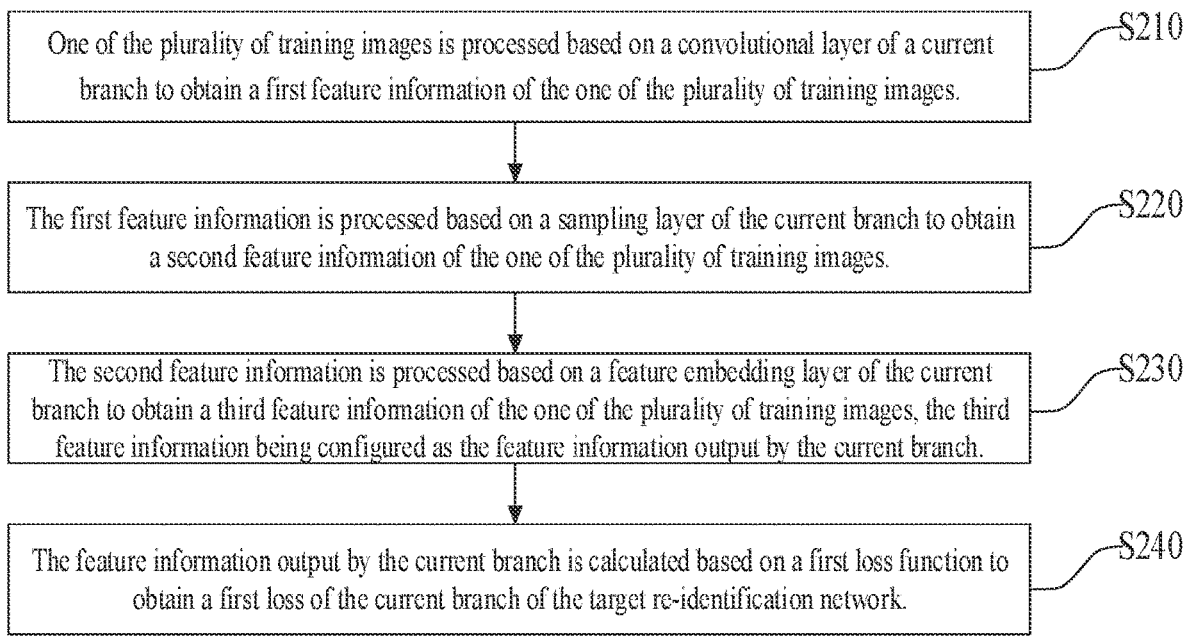
FIG. 2 is a flow chart of a training method for a target re-identification network according to a second embodiment of the present disclosure.

FIG. 2 is a flow chart of a training method for a target re-identification network according to a second embodiment of the present disclosure. It should be noted that, when there are substantially the same results, the embodiment is not limited to the sequence of the process shown in FIG. 2. In the embodiment, each branch of the target re-identification network includes a convolutional layer, a sampling layer, and a feature embedding layer. Operations S210-S230 are an extension of the above S120, and operation S240 is an extension of the above S130. The method may include operations at blocks illustrated in FIG. 2.

At block S210: One of the plurality of training images is processed based on a convolutional layer of a current branch to obtain a first feature information of the one of the plurality of training images.

A basic network structure of the target re-identification network of the present disclosure may be a residual network structure similar to RetNet50. Therefore, the convolutional layer of each branch of the target re-identification network may be a residual block convolutional layer.

In some embodiments, the target re-identification network includes n branches, where the feature information output by a first branch does not include local feature information, the feature information output by an i-th branch includes i local feature information. The area corresponding to the i local feature information of the i-th branch may cover the training image. i is greater than 1 and less than or equal to n. And/or, the feature information output by each branch includes global feature information.

It can be understood that the global feature information is the feature information of the entire training image, that is, the feature map of the training image. The i local feature information (feature map blocks) output by the i-th branch may constitute the global feature information (feature map) output by the i-th branch.

In some embodiments, the target re-identification network includes n branches, and each branch includes n convolutional layers. The convolutional layers shared by different branches are different.

Figure 3:
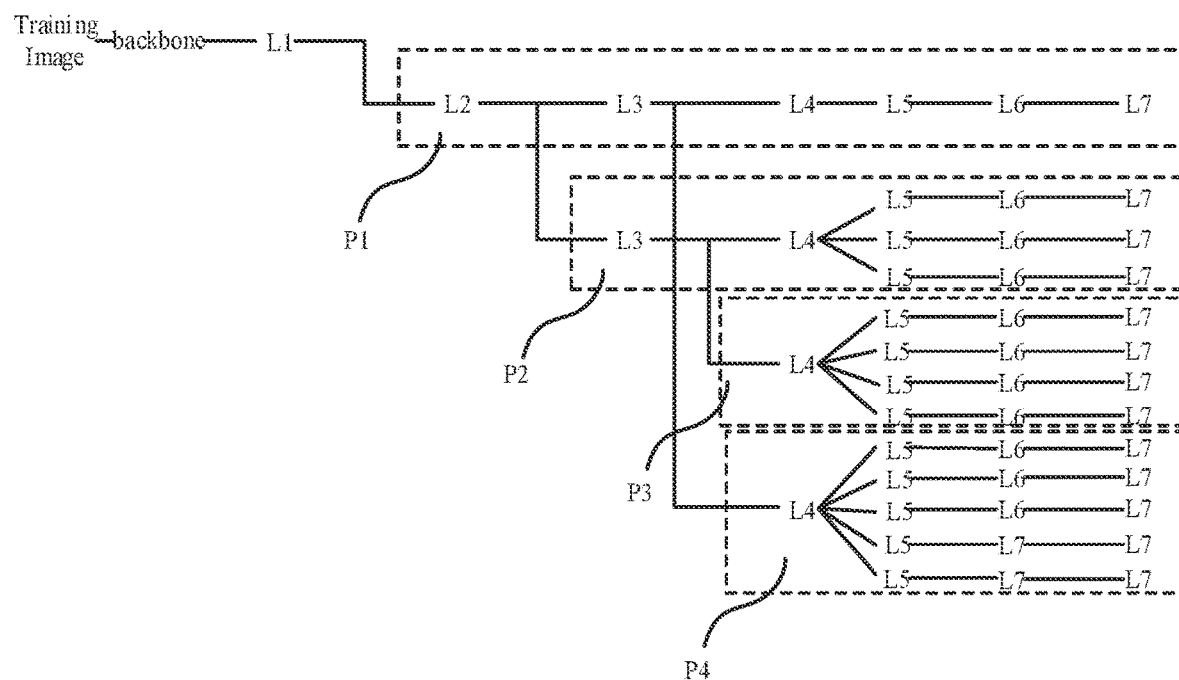
FIG. 3 is a structural schematic view of a target re-identification network according to an embodiment of the present disclosure.

Taking n=4 as an example for description, FIG. 3 is a structural schematic view of a target re-identification network according to an embodiment of the present disclosure. As shown in FIG. 3, the target re-identification network includes a first branch (P1), a second branch (P2), a third branch (P3), and a fourth branch (P4). Each branch includes a first convolutional layer (L1), a second convolutional layer (L2), a third convolutional layer (L3), and a fourth convolutional layer (L4). The second branch (P2) and the first branch (P1) share the first convolutional layer (L1) and the second convolutional layer (L2). The third branch (P3) and the second branch (P2) share the first convolutional layer (L1), the second convolutional layer (L2) and the third convolutional layer (L3). The fourth branch (P4) and the first branch (P1) share the first convolutional layer (L1), the second convolutional layer (L2) and the third convolutional layer (L3).

The target re-identification network shown in FIG. 3 includes 13 sub-branches, including 4 coarse-grained global feature extraction branches and 9 fine-grained local feature extraction branches.

P1, P2, P3, and P4 share structures and parameters of L1 and networks before L1. P1 connects to the network directly after the shared L1, and serves as a backbone branch without stripe blocking. Therefore, P1 can output a global feature information.

The feature information output by L2 of P1 will be sent to P2. P2 includes a global feature sub-branch and two local feature sub-branches. The two local feature sub-branches are obtained by dividing the feature information output by L4 of P2 into two equal strips. Therefore, P2 can output a global feature information and two local feature information.

The feature information output by L3 of P2 will be sent to P3. P3 includes a global feature sub-branch and three local feature sub-branches. The three local feature sub-branches are obtained by dividing the feature information output by L4 of P3 into three equal strips. Therefore, P3 can output a global feature information and three local feature information.

The feature information output by L3 of P1 will be sent to P4. P4 includes a global feature sub-branch and four local feature sub-branches. The four local feature sub-branches are obtained by dividing the feature information output by L4 of P4 into four equal strips. Therefore, P4 can output a global feature information and four local feature information.

In other embodiments, the design of the foregoing network structure (such as an access mode and a blocking mode of the network branch) may also be other modes, and the foregoing examples are not meant to limit the present disclosure. For example, the above-mentioned striping method may be horizontal stripe block, vertical stripe block, etc. Alternatively, the block method may also be equal block, non-equal block, or the like. In practical applications, most pedestrian images are well aligned, so pedestrian images are usually divided equally.

Through the design of the above network structure, there are at least the following advantages.

First, P2 is connected from L2 of P1, P3 is connected from L3 of P2, and P4 is connected from L3 of P1. Such a network topology design has characteristics of hierarchical sharing. Compared with the design of connecting multiple branches from a same convolutional layer, the network structure of the embodiment may effectively reduce the parameter amount of the target re-identification network and improve the training efficiency of the network.

Second, P1 does not include local feature sub-branches, P2 includes two local feature sub-branches (feature map blocks), P3 includes three local feature sub-branches, and P4 includes four local feature sub-branches. Therefore, as the network deepens, the network branches are segmented from coarse-grained to fine-grained stripes (progressive segmentation) to form the global feature information and local feature information with rich granularity.

Third, P3 is connected from L3 of P2, such that the (two) feature map blocks output by P2 and the (three) feature map blocks output by P3 have non-overlapping regions, thereby enhancing the feature robustness of the network for situations such as image occlusion or misalignment.

Fourth, since the (two) feature map blocks output by P2 and the (four) feature map blocks output by P4 completely overlap, the P4 branch is not connected from the P2 branch. Since both P4 and P3 include only one convolutional layer L4, and the feature map blocks output by P4 belong to a more fine-grained local feature information expression, P4 is connected from L3 of P1 to improve the feature semantics of the input P4 output.

When each branch includes n convolutional layers, the first feature information is the feature information output by the n-th convolutional layer, that is, the feature information output by the last convolutional layer. In some embodiments, the size of the first feature information output by the last convolutional layer of the first branch is smaller than the size of the first feature information output by the last convolutional layer of other branches.

Still taking n=4 as an example, a down-sampling step size of L4 of P1 is 2, and the down-sampling step size of L4 of P2, P3, P4 is 1. Therefore, the size of the feature information output by P1 is double the size of the feature information output by P2, P3, P4. Setting the down-sampling step size of L4 of P2, P3, and P4 to 1 may retain more feature information.

At block S220: The first feature information is processed based on a sampling layer of the current branch to obtain a second feature information of the one of the plurality of training images.

Taking n=4 as an example for description, as shown in FIG. 3, each branch also includes a sampling layer (L5). The sampling layer may also be called a pooling layer, which may include a maximum sampling unit and/or an average sampling unit. Therefore, the sampling layer of the current branch may perform maximum sampling processing and/or average sampling processing on the input first feature information. The second feature information may be the feature information output after the maximum sampling unit performs the maximum sampling process on the first feature information, or may be the feature information output after the average sampling unit performs the average sampling process on the first feature information, or may be the feature information output by the maximum sampling unit and the feature information output by the average sampling unit.

For example, when the sampling layer includes the maximum sampling unit and the average sampling unit, the output features of the two sampling units are added to obtain a 2048-dimensional second feature information after fusion.

At block S230: The second feature information is processed based on a feature embedding layer of the current branch to obtain a third feature information of the one of the plurality of training images, the third feature information being configured as the feature information output by the current branch.

Still taking n=4 as an example, as shown in FIG. 3, each branch also includes a feature embedding layer (L6). The feature embedding layer may include a 1×1 convolution unit and a batch regularization (BN) unit, such that a dimensionality reduction operation on the feature information output by the sampling layer may be performed to obtain a 256-dimensional third feature information, which may be configured as the feature information output by the current branch, facilitating subsequent processing.

At block S240: The feature information output by the current branch is calculated based on a first loss function to obtain a first loss of the current branch of the target re-identification network.

The first loss function may be a triple loss function. The triple loss function is a function that measures the distance between the feature information/feature vectors of three images in the training image set. Two of the three images are images of a same target, and the other image is an image of another target. In other words, there are two images of a same category in the three images, and one image of a different category. In this operation, the triple loss function may be applied to measure the distance between the feature information.

When the feature information output by the current branch only includes the global feature information, the triplet loss function may be applied to calculate the distance between the global feature information of different training images output. When the feature information output by the current branch includes the global feature information and the multiple local feature information, the triplet loss function may be applied to calculate the distance between the global feature information of different training images, and calculate the distance between cascaded local feature information of different training images after cascading the multiple local feature information of a same training image output from the current branch. In addition, the sum of the distances calculated based on the feature information of all training images output by the current branch may be configured as the first loss.

For example, the training image set includes images of 16 target (4 images for each target), and a total of 64 training images are included. The third feature information output by the feature embedding layer of the current branch includes 64 groups. The triple loss function may be applied to calculate the distances of the 64 groups of images, and the sum of the distances of the 64 groups of images may be configured as the first loss.

In the embodiment, the training image is processed by the convolutional layer, the sampling layer, and the feature embedding layer to obtain the feature information of the training image. The triple loss function is applied to measure the distance between the feature information (the first loss). Based on the first loss, parameters of the target re-identification network are adjusted. In this way, the problem of large intra-class differences and small inter-classes differences in the feature information extracted by the target re-identification network may be mitigated.

Figure 4:
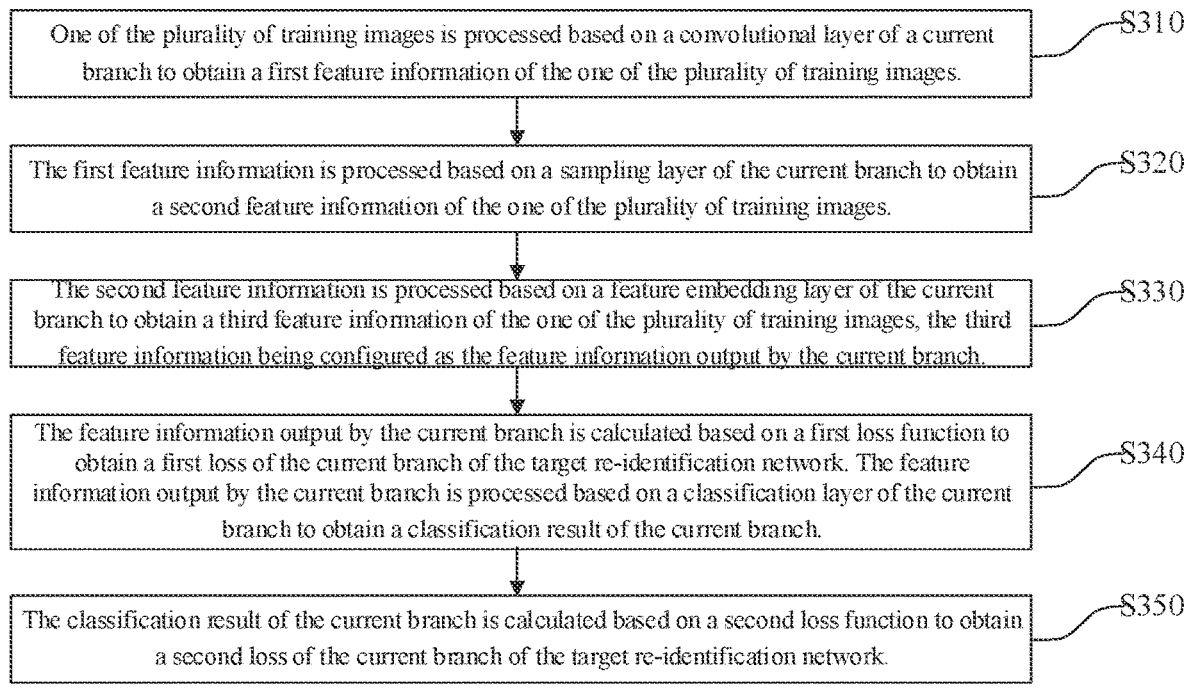
FIG. 4 is a flow chart of a training method for a target re-identification network according to a third embodiment of the present disclosure.

FIG. 4 is a flow chart of a training method for a target re-identification network according to a third embodiment of the present disclosure. It should be noted that, if there are substantially the same results, this embodiment is not limited to the sequence of the process shown in FIG. 4. In this embodiment, each branch of the target re-identification network includes a convolutional layer, a sampling layer, a feature embedding layer, and a classification layer. Operations S310-S330 are extensions of the above operation S120, and operations S340-S350 are extensions of the above operation S130. The method may include operations at blocks illustrated in FIG. 4.

At block S310: One of the plurality of training images is processed based on a convolutional layer of a current branch to obtain a first feature information of the one of the plurality of training images.

At block S320: The first feature information is processed based on a sampling layer of the current branch to obtain a second feature information of the one of the plurality of training images.

At block S330: The second feature information is processed based on a feature embedding layer of the current branch to obtain a third feature information of the one of the plurality of training images, the third feature information being configured as the feature information output by the current branch.

For detailed descriptions of operations S310-S330 in the embodiment, reference may be made to the previous embodiments, which will not be repeated herein.

At block S340: The feature information output by the current branch is calculated based on a first loss function to obtain a first loss of the current branch of the target re-identification network. The feature information output by the current branch is processed based on a classification layer of the current branch to obtain a classification result of the current branch.

Still taking n=4 as an example for description, as shown in FIG. 2, each branch may also include a classification layer (L7). The classification layer has weight parameters for each category. Specifically, the feature information output by the current branch may be processed based on the weight parameters of the classification layer to obtain the classification result of the current branch. The classification result of the current branch may be a feature transformation of the feature information output by the current branch, where the following formula may be applied to obtain the classification result h of the current branch.

$$h(\gamma, \cos\theta) = \frac{\gamma}{1 + e^{-\gamma \cdot \cos\theta}}$$

$$\cos\theta = W' \cdot f'(x_i)$$

W' is the weight parameter of the classification layer of the current branch, $f'(x_i)$ is the feature information of the i-th training image output by the current branch, $\gamma$ is a parameter to be trained for the current branch, and an initial value of $\gamma$ may be set to 1. Therefore, the classification layer introduces an adaptively learnable parameter $\gamma$ through a smooth feature transformation h.

The above $f'(x_i)$ may be the result of normalizing the feature information of the i-th training image output by the current branch, and W' may be the result of normalizing the weight parameters of the original classification layer. The formula for normalizing is as follows.

$$\begin{cases} \|W_j\| = 1 \\ \|f(x_i)\| = 1 \end{cases}$$

$W_j$ (j=0,1, ... ,K−1) is the weight parameter corresponding to the j-th category in the original classification layer, and $f(x_i)$ is the feature information of the i-th training image output by the original current branch.

At block S350: The classification result of the current branch is calculated based on a second loss function to obtain a second loss of the current branch of the target re-identification network.

The second loss function may be a cross-entropy loss function. The second loss function may be applied to calculate a separate second loss/classification loss for each sub-branch, such that on the basis of adjusting the current branch parameters based on the first loss, the parameters of the current branch network is further adjusted based on the calculated second loss, thereby improving the discrimination of the feature information extracted by the target re-identification network.

In the embodiment, the classification layer introduces a learnable parameter through a balanced feature transformation. Therefore, the second loss may be calculated based on the feature transformation, such that each branch of the target re-identification network may adaptively learn parameters based on the second loss, effectively training the target re-identification network.

Different from the above second and third embodiments, in another embodiment of the present disclosure, each branch of the target re-identification network includes a convolutional layer and a classification layer. The first feature information output by the convolutional layer may be configured as the feature information output by the current branch.

In another embodiment of the present disclosure, each branch of the target re-identification network includes a convolutional layer, a sampling layer/feature embedding layer, and a classification layer. When the sampling layer is included but the feature embedding layer is not included, the second feature information output by the sampling layer may be configured as the feature information output by the current branch. When the feature embedding layer is included but the sampling layer is not included, the feature embedding layer processes the first feature information output by the convolutional layer to obtain a third feature information. The third feature information is configured as the feature information output by the current branch.

Figure 5:
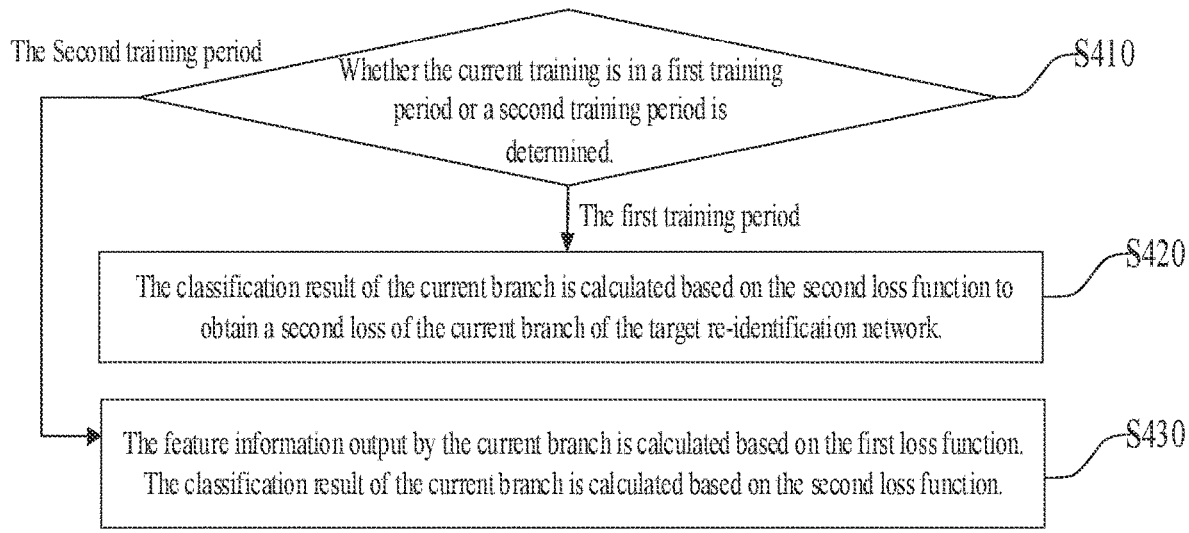
FIG. 5 is a flow chart of a training method for a target re-identification network according to a fourth embodiment of the present disclosure.

FIG. 5 is a flow chart of a training method for a target re-identification network according to a fourth embodiment of the present disclosure. It should be noted that, if there are substantially the same results, this embodiment is not limited to the sequence of the process shown in FIG. 5. This embodiment is a further extension of the above-mentioned operation S130 on the basis of the second embodiment or the third embodiment. The method may include operations at blocks illustrated in FIG. 5.

At block S410: Whether the current training is in a first training period or a second training period is determined.

When the current training is in the first training period, operation S420 is performed. When the current training is in the second training period, operation S430 is performed.

One of the first training period and the second training period is an odd training period, and the other is an even training period.

At block S420: The classification result of the current branch is calculated based on the second loss function to obtain a second loss of the current branch of the target re-identification network.

At block S430: The feature information output by the current branch is calculated based on the first loss function. The classification result of the current branch is calculated based on the second loss function.

In the embodiment, considering that the first loss is calculated based on the feature information constraint by the Euclidean space, the second loss is calculated based on the feature information constraint by the spherical space. When the network is trained on the two spaces at the same time, the training difficulty may increase. Therefore, on the basis of the above third embodiment, the training period may be set for the training process of the target re-identification network. An optimizer (such as Adam, Momentum, AdaGrad, SGD, etc.) may be configured to train the target re-identification network for a specified number of periods. When the training is in the first training period, the first loss of the target re-identification network is calculated. When the training is in the second training period, the second loss of the target re-identification network is calculated. In this way, the difficulty of training the target re-identification network may be reduced.

Different from the fourth embodiment, in other embodiments, the feature information output by the current branch may be calculated based on the first loss function in the first training period to obtain the first loss. The feature information output by the current branch is calculated based on the first loss function and the classification result of the current branch is calculated based on the second loss function in the second training period.

The target re-identification network trained through the above embodiments may be applied to identify the image to be identified to retrieve a reference image matching the image to be identified in the base database. The target in the reference image matching the image to be identified is the same as the target in the image to be identified, or the similarity reaches a preset similarity threshold.

Figure 6:
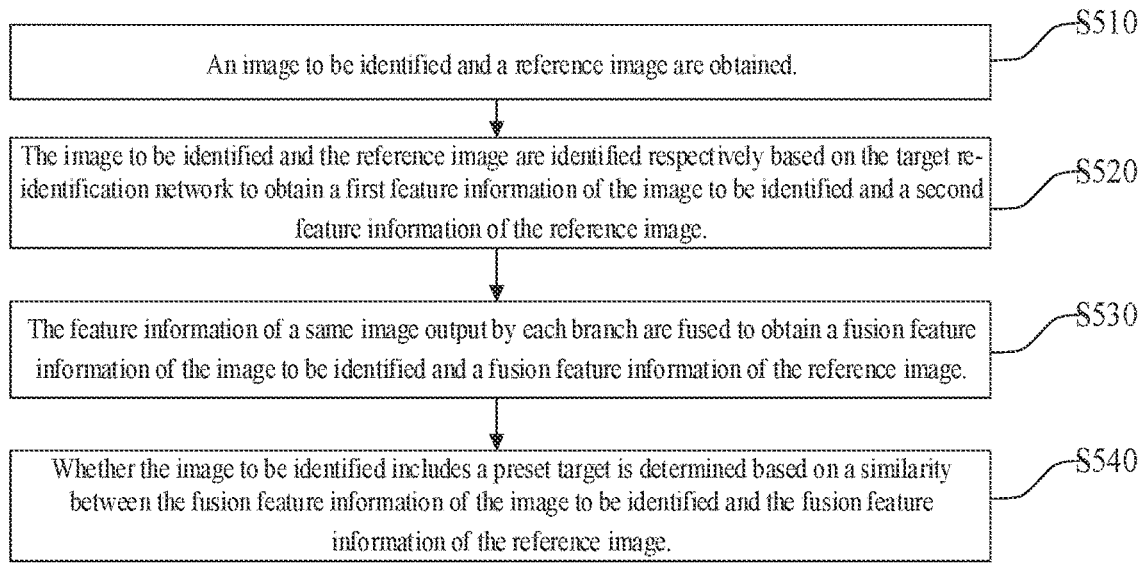
FIG. 6 is a flow chart of a target re-identification method according to an embodiment of the present disclosure.

As shown in FIG. 6, FIG. 6 is a flow chart of a target re-identification method according to an embodiment of the present disclosure. It should be noted that, if there are substantially the same results, this embodiment is not limited to the sequence of the process shown in FIG. 6. The method may include operations at blocks illustrated in FIG. 6.

At block S510: An image to be identified and a reference image are obtained.

The reference image includes a preset target.

The reference image may be an image in the base library, and the target information included in the reference image is known. The reference image may be one or more. The image to be identified may be one or more. In the subsequent operations of this embodiment, the image to be identified is one image and the reference image is multiple as an example.

At block S520: The image to be identified and the reference image are identified respectively based on the target re-identification network to obtain a first feature information of the image to be identified and a second feature information of the reference image.

The target re-identification network may include a plurality of branches. The feature information may include feature information output by each branch. The feature information output by one branch of the target re-identification network may include n local feature information, where n is greater than 3. The n local feature information correspond to different regions of the corresponding image.

The first feature information of the image to be identified includes the feature information of the image to be identified output by each branch of the target re-identification network. The second feature information includes the feature information of the reference image output by each branch. The feature information of the image to be identified here refers to the feature information of a single image to be identified, and the feature information of the reference image is the feature information of a single reference image.

The target re-identification network involved in this embodiment may, but is not limited to, a target re-identification network obtained through the above training method.

At block S530: The feature information of a same image output by each branch are fused to obtain a fusion feature information of the image to be identified and a fusion feature information of the reference image.

The global/local feature information of the image to be identified output by each branch is cascaded and normalized to obtain the fusion information of the image to be identified. The global/local feature information of a same reference image output by each branch is fused to obtain the fusion feature information of each reference image.

At block S540: Whether the image to be identified includes a preset target is determined based on a similarity between the fusion feature information of the image to be identified and the fusion feature information of the reference image.

The similarity between the fusion feature information of the image to be identified and the fusion feature information of each reference image is calculated respectively. Since the features are normalized, Euclidean distance may be applied to calculate the similarity, or cosine distance may be applied to calculate the similarity. Taking the calculating similarity by cosine distance as an example, the formula for calculating the similarity is as follows.

$$\cos(\vec{X}, \vec{Y}) = \vec{X} \cdot \vec{Y}$$

$\vec{X}$ is the fusion feature information expression of the image to be identified, and $\vec{Y}$ is the fusion feature information expression of the current reference image. The smaller the calculated value, the greater the similarity between the image to be identified and the current reference image.

It can be determined whether the image to be identified includes the preset target according to the calculated similarity. For example, when the similarity between the image to be identified and the reference image is equal to 1 or greater than a preset first similarity threshold, it is considered that the image to be identified includes the preset target in the current reference image. When the similarity between the image to be identified and the reference image is equal to 0 or less than a preset second similarity threshold, it is considered that the image to be identified does not include the preset target in the current reference image. The preset first similarity threshold is greater than the preset second similarity threshold. For another example, after the similarity is calculated, the reference images may be sorted according to the similarity, and the sorting result may be configured as the returned result. Of course, a top preset number of the reference images or the reference image with the greatest similarity may be returned as the result, such that sorting results and score visualization may be realized. The sorting result can reflect the probability that the target in the image to be identified is the preset target in the reference image.

Figure 7:
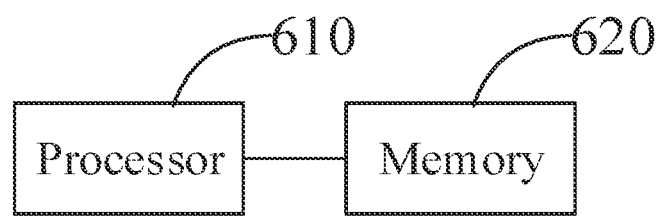
FIG. 7 is a structural schematic view of an electronic device according to an embodiment of the present disclosure.

FIG. 7 is a structural schematic view of an electronic device according to an embodiment of the present disclosure. As shown in FIG. 7, the electronic device includes a processor 610 and a memory 620 coupled to the processor.

The memory 620 stores program instructions for implementing the method of any of the foregoing embodiments. The processor 610 is configured to execute the program instructions stored in the memory 620 to implement the operations of the foregoing method embodiments. The processor 610 may also be referred to as a central processing unit (CPU). The processor 610 may be an integrated circuit chip with signal processing capabilities. The processor 610 may also be a general-purpose processor, a digital signal processor (DSP), an application specific integrated circuit (ASIC), a field programmable gate array (FPGA) or other programmable logic device, a discrete gate or transistor logic device, or a discrete hardware component. The general-purpose processor may be a microprocessor. Or, the processor may also be any conventional processor or the like.

Figure 8:
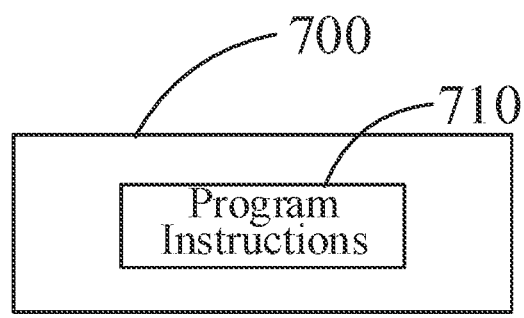
FIG. 8 is a structural schematic view of a storage medium according to an embodiment of the present disclosure.

FIG. 8 is a structural schematic view of a storage medium according to an embodiment of the present disclosure. As shown in FIG. 8, the storage medium 700 stores program instructions 710, and the program instructions 710 implement the method provided in the foregoing embodiments of the present disclosure when executed. The program instructions 710 may form a program file and be stored in the storage medium 700 in the form of a software product, so that a computer device (may be a personal computer, a server, or a network device, etc.) or a processor executes all or part of the operations of each implementation method in the present disclosure. The storage medium 700 includes: U disk, mobile hard disk, read-only memory (ROM), random access memory (RAM), magnetic disk or optical disk, etc., which is a medium capable of storing program codes, or terminal devices such as computers, servers, mobile phones, tablets, etc.

In the several embodiments provided in the present disclosure, it should be understood that the disclosed system, device, and method may be implemented in other ways. For example, the device embodiments described above are only illustrative. For example, the division of units is only a logical function division, and there may be other divisions in actual implementation. For example, multiple units or components can be combined or integrated to another system, or some features can be ignored or not implemented. In addition, the displayed or discussed mutual coupling or direct coupling or communication connection may be indirect coupling or communication connection through some interfaces, devices or units, and may be in electrical, mechanical or other forms.

In addition, the functional units in the various embodiments of the present disclosure may be integrated into one processing unit, or each unit may exist alone physically, or two or more units may be integrated into one unit. The integrated unit can be implemented in the form of hardware or software functional unit. The above are only implementations of the present disclosure, and do not limit the scope of the present disclosure. Any equivalent structure or equivalent process transformation made on the basis of the content of the specification and drawings of the present disclosure, or directly or indirectly applied to other related technical fields, shall be within the scope of the present disclosure.

What is claimed is:

1. A method for training a target re-identification network, comprising:
    obtaining a training image set, wherein the training image set comprises a plurality of training images;
    for each of the plurality of training images in the training image set:
        identifying a training image based on the target re-identification network to obtain an identification result of the training image; wherein the target re-identification network comprises a plurality of branches, the identification result of the training image comprises a feature information output by each of the plurality of branches and a classification result corresponding to the feature information; the feature information output by one of the plurality of branches comprises n local feature information, the n being an integer greater than 3; the n local feature information correspond to different regions of the training image; and
    adjusting parameters of each of the plurality of branches of the target re-identification network based on the identification result.

2. The method according to claim 1, wherein the number of the plurality of branches is n, the feature information output by a first branch does not comprise the local feature information, the feature information output by an i-th branch comprises i local feature information local feature information; regions corresponding to the i local feature information local feature information of the i-th branch cover the plurality of training images; i is greater than 1 and less than or equal to n; and/or,
    the feature information output by each of the plurality of branches comprises a global feature information.

3. The method according to claim 1, wherein the adjusting parameters of each of the plurality of branches of the target re-identification network based on the identification result comprises:
    calculating a loss of each of the plurality of branches of the target re-identification network based on the identification result of the training image; and
    adjusting the parameters of each of the plurality of branches of the target re-identification network based on the loss.

4. The method of claim 3, wherein each of the plurality of branches comprises a convolutional layer, a sampling layer, and a feature embedding layer; the identifying the training image based on the target re-identification network to obtain an identification result of the training image comprises:
    for each of the plurality of branches of the target re-identification network:
    processing the training image based on the convolutional layer of a branch to obtain a first feature information of the training image;
    processing the first feature information based on the sampling layer of the branch to obtain a second feature information of the training image; and
    processing the second feature information based on the feature embedding layer of the branch to obtain a third feature information of the training image, the third feature information being configured as the feature information output by the branch;
    wherein the calculating a loss of each of the plurality of branches of the target re-identification network based on the identification result of the training image comprises:
    calculating the feature information output by the branch based on a first loss function to obtain a first loss of the branch of the target re-identification network.

5. The method of claim 3, wherein each of the plurality of branches comprises a convolutional layer, and a sampling layer; the identifying the training image based on the target re-identification network to obtain an identification result of the training image comprises:
    for each of the plurality of branches of the target re-identification network:
    processing the training image based on the convolutional layer of a branch to obtain a first feature information of the training image, the first feature information being configured as the feature information output by the branch.

6. The method of claim 3, wherein each of the plurality of branches comprises a convolutional layer, a sampling layer, and a classification layer; the identifying the training image based on the target re-identification network to obtain an identification result of the training image comprises:
    for each of the plurality of branches of the target re-identification network:
    processing the training image based on the convolutional layer of a branch to obtain a first feature information of the training image; and
    processing the first feature information based on the sampling layer of the branch to obtain a second feature information of the training image, the second feature information being configured as the feature information output by the branch.

7. The method of claim 3, wherein each of the plurality of branches comprises a convolutional layer, a feature embedding layer, and a classification layer; the identifying the training image based on the target re-identification network to obtain an identification result of the training image comprises:

for each of the plurality of branches of the target re-identification network:
processing the training image based on the convolutional layer of a branch to obtain a first feature information of the training image; and
processing the first feature information based on the feature embedding layer of the branch to obtain a third feature information of the training image, the third feature information being configured as the feature information output by the branch.

8. The method of claim 4, wherein the number of the plurality of branches is n, each of the n branches comprises n convolutional layers; convolutional layers shared by different branches are different.

9. The method of claim 4, wherein each of the plurality of branches comprises further comprises a classification layer; the identifying the training image based on the target re-identification network to obtain an identification result of the training image further comprises:
processing the feature information output by the branch based on the classification layer of the branch to obtain a classification result of the branch;
wherein the calculating a loss of each of the plurality of branches of the target re-identification network based on the identification result of the training image comprises:
calculating the classification result of the branch based on a second loss function to obtain a second loss of the branch of the target re-identification network.

10. The method according to claim 4, wherein the first loss function is a triple loss function, and the second loss function is a cross-entropy loss function.

11. The method of claim 8, wherein:
the size of the feature information output by a last convolutional layer of a first branch of the n branches is smaller than the size of the feature information output by a last convolutional layer of other branches of the n branches; and/or,
the n is 4, the n branches comprise a first branch, a second branch, a third branch, and a fourth branch; each of the 4 branches comprises a first convolutional layer, a second convolutional layer, a third convolutional layer, and a fourth convolutional layer;
the second branch and the first branch share the first convolutional layer and the second convolutional layer; the third branch and the second branch share the first convolutional layer, the second convolutional layer, and the third convolutional layer; the fourth branch and the first branch share the first convolutional layer, the second convolutional layer, and the third convolutional layer.

12. The method of claim 9, wherein the processing the feature information output by the branch based on the classification layer of the branch to obtain a classification result of the branch comprises:
processing the feature information output by the branch based on a weight parameter of the classification layer to obtain the classification result of the branch.

13. The method according to claim 9, wherein the adjusting the parameters of each of the plurality of branches of the target re-identification network based on the loss comprises:
in response to the training being in a first training period, performing the calculating the classification result of the branch based on a second loss function to obtain a second loss of the branch of the target re-identification network;
in response to the training being in a second training period, performing the calculating the feature information output by the branch based on a first loss function and the calculating the classification result of the branch based on a second loss function, to obtain the first loss and the second loss of the target re-identification network;
wherein one of the first training period and the second training period is an odd training period, and the other is an even training period.

14. The method of claim 12, wherein the processing the feature information output by the branch based on a weight parameter of the classification layer to obtain the classification result of the branch comprises:
obtaining the classification result h of the branch based on a formula as:

$$h(\gamma, \cos\theta) = \frac{\gamma}{1 + e^{-\gamma \cdot \cos\theta}}$$

$$\cos\theta = W' \cdot f'(x_i)$$

where W' is the weight parameter of the classification layer of the branch, f'($x_i$) is the feature information of an i-th training image output by the branch, $\gamma$ is a parameter to be trained for the branch.

15. A target re-identification method, comprising:
obtaining an image to be identified and a reference image, wherein the reference image comprises a preset target;
identifying the image to be identified and the reference image respectively based on a target re-identification network to obtain a feature information of the image to be identified and a feature information of the reference image; wherein the target re-identification network comprises a plurality of branches; the feature information comprises the feature information output by each of the plurality of branches; the feature information output by one of the plurality of branches comprises n local feature information, the n being greater than 3; the n local feature information correspond to different regions of a corresponding image;
fusing the feature information of the image to be identified output by each of the plurality of branches to obtain a fusion feature information of the image to be identified, and fusing the feature information of the reference image output by each of the plurality of branches a fusion feature information of the reference image; and
determining whether the image to be identified comprises the preset target based on a similarity between the fusion feature information of the image to be identified and the fusion feature information of the reference image, wherein the target re-identification network is trained by:
obtaining a training image set, wherein the training image set comprises a plurality of training images;
for each of the plurality of training images in the training image set:
identifying a training image based on the target re-identification network to obtain an identification result of the training image; wherein the identification result of the training image comprises a feature information of the training image output by each of the plurality of branches and a classification result corresponding to the feature information; the feature information of the training image output by one of the plurality of branches comprises n local feature information of the training image, the n being an integer greater than 3; the n local feature information of the training image correspond to different regions of the training image; and adjusting parameters of each of the plurality of branches of the target re-identification network based on the identification result.

16. A system for training a target re-identification network, comprising:

a storage device storing a set of instructions;

at least one processor in communication with the storage device, wherein when executing the set of instructions, the at least one processor is configured to direct the system to perform operations including:

obtaining a training image set, wherein the training image set comprises a plurality of training images;

for each of the plurality of training images in the training image set:

identifying a training image based on the target re-identification network to obtain an identification result of the training image; wherein the target re-identification network comprises a plurality of branches, the identification result of the training image comprises a feature information output by each of the plurality of branches and a classification result corresponding to the feature information; the feature information output by one of the plurality of branches comprises n local feature information, the n being an integer greater than 3; the n local feature information correspond to different regions of the training image; and adjusting parameters of each of the plurality of branches of the target re-identification network based on the identification result.

17. The system according to claim 16, wherein the number of the plurality of branches is n, the feature information output by a first branch does not comprise the local feature information, the feature information output by an i-th branch comprises i local feature information; regions corresponding to the i local feature information of the i-th branch cover the plurality of training images; i is greater than 1 and less than or equal to n; and/or, the feature information output by each of the plurality of branches comprises a global feature information.

18. The system according to claim 16, wherein the adjusting parameters of each of the plurality of branches of the target re-identification network based on the identification result comprises:

calculating a loss of each of the plurality of branches of the target re-identification network based on the identification result of the training image; and adjusting the parameters of each of the plurality of branches of the target re-identification network based on the loss.

19. The method of claim 18, wherein each of the plurality of branches comprises a convolutional layer, a sampling layer, and a feature embedding layer; the identifying the training image based on the target re-identification network to obtain an identification result of the training image comprises:

for each of the plurality of branches of the target re-identification network:

processing the training image based on the convolutional layer of a branch to obtain a first feature information of the training image;

processing the first feature information based on the sampling layer of the branch to obtain a second feature information of the training image; and processing the second feature information based on the feature embedding layer of the branch to obtain a third feature information of the training image, the third feature information being configured as the feature information output by the branch;

wherein the calculating a loss of each of the plurality of branches of the target re-identification network based on the identification result of the training image comprises:

calculating the feature information output by the branch based on a first loss function to obtain a first loss of the branch of the target re-identification network.

20. The system of claim 18, wherein each of the plurality of branches comprises a convolutional layer, and a sampling layer; the identifying the training image based on the target re-identification network to obtain an identification result of the training image comprises:

for each of the plurality of branches of the target re-identification network:

processing the training image based on the convolutional layer of a branch to obtain a first feature information of the training image, the first feature information being configured as the feature information output by the branch.

* * * * *